United States Patent [19]
Feder

[11] 4,103,640
[45] Aug. 1, 1978

[54] GRAVITY IMPACT INDICATOR FOR SHIPPING CONTAINERS

[76] Inventor: Leo Feder, 1734 Ellincourt Dr., South Pasadena, Calif. 91030

[21] Appl. No.: 798,373

[22] Filed: May 19, 1977

[51] Int. Cl.² ............................................. G01P 15/04
[52] U.S. Cl. ................................. 116/114 AH; 73/492
[58] Field of Search ..................... 116/114 AH, 129 B; 73/392, 396, 492

[56] References Cited

U.S. PATENT DOCUMENTS

| | | | |
|---|---|---|---|
| 1,402,139 | 1/1922 | Bradley | 73/396 |
| 1,438,798 | 12/1922 | Walker | 73/396 |
| 2,825,297 | 3/1958 | Harrison | 116/114 AH |
| 3,142,992 | 8/1964 | Smith | 73/492 X |
| 3,610,199 | 10/1971 | Prachar | 116/114 AH |
| 3,656,352 | 4/1972 | Low et al. | 116/114 AH |

*Primary Examiner*—Daniel M. Yashich
*Attorney, Agent, or Firm*—Robert C. Comstock

[57] ABSTRACT

A gravity impact indicator for shipping containers carrying valuable delicate cargo. The indicator comprises a sealed case, within the hollow interior of which a weight is suspended from an elongated coil spring. When the container is subjected to gravity impact, such as being dropped, the force moves the weight downwardly within the case. A flat spring extends transversely to the weight and engages ratchet teeth carried by the case to hold the weight in the lowermost position to which it is moved. Indicia may be carried by the case to designate the amount of impact. Track means and the inner surfaces of the case guide the weight against tipping during its downward movement.

10 Claims, 5 Drawing Figures

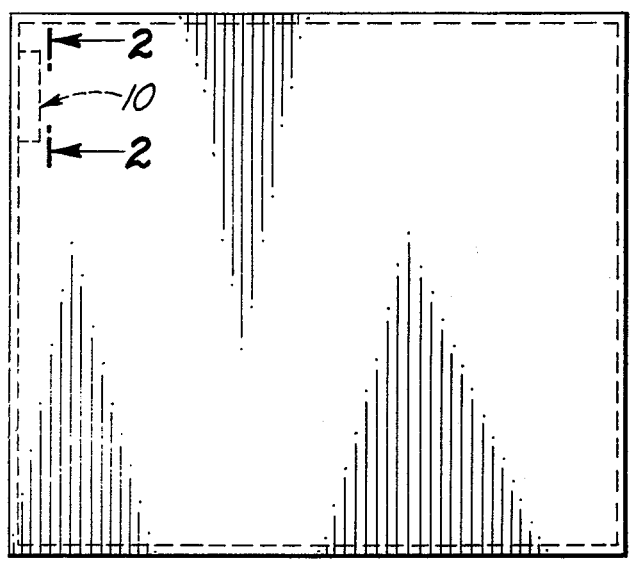
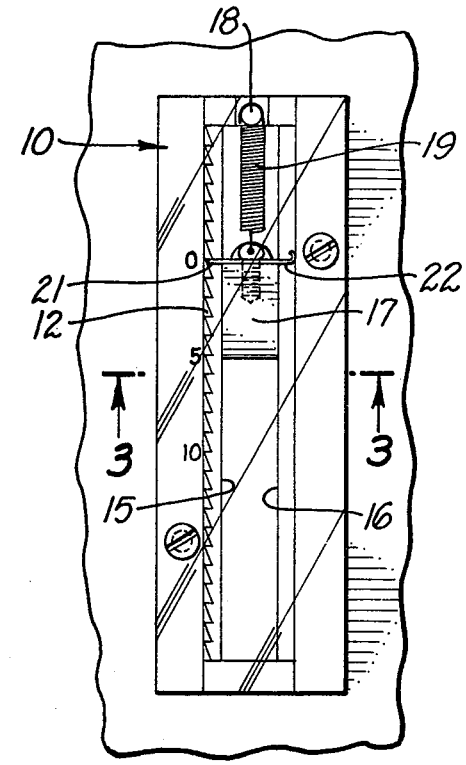
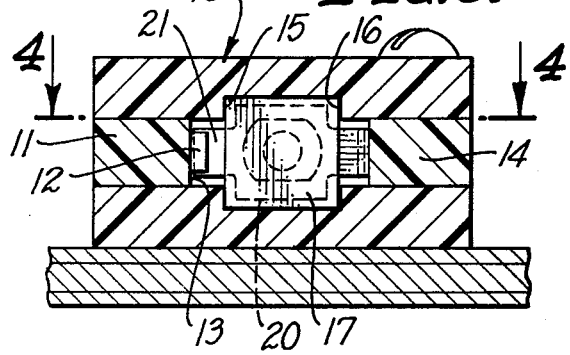
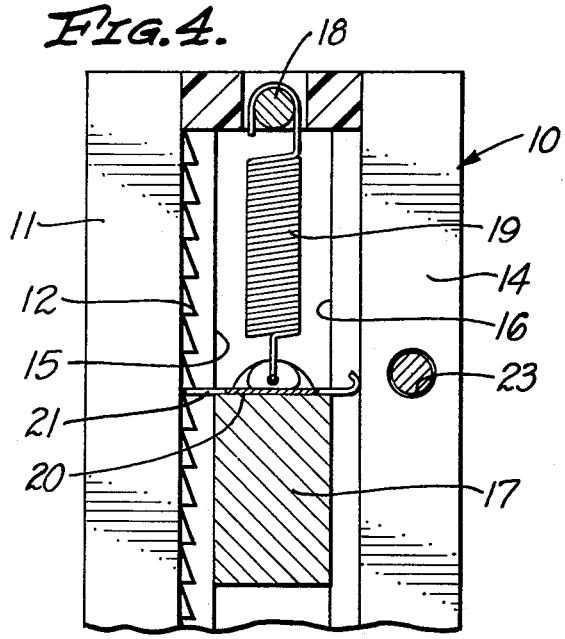
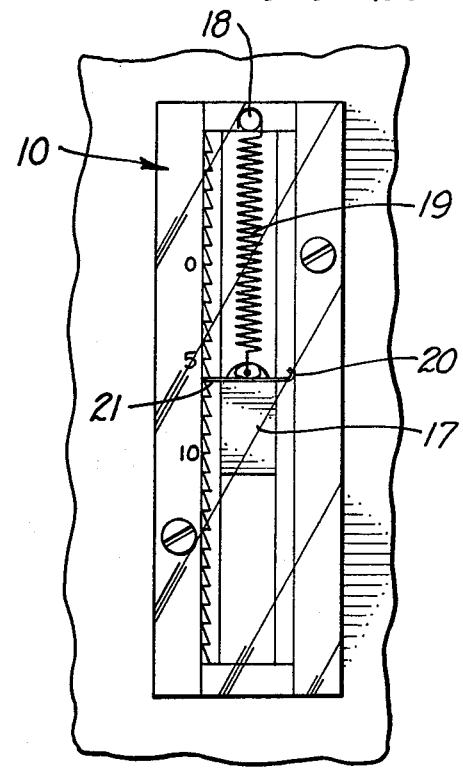

GRAVITY IMPACT INDICATOR FOR SHIPPING CONTAINERS

BACKGROUND OF THE INVENTION

1. Field of the Invention

The invention relates to a device for indicating the amount of gravity impact to which a shipping container has been subjected.

2. Description of the Prior Art

There is a need for an indicating device which can be mounted in a shipping container carrying valuable delicate cargo such as precision instruments, computer equipment, electronic components, controls, etc. A single container of such precision devices may be worth many thousands of dollars and the devices may be completely destroyed if the container should be dropped.

In order to properly assess liability for damage which may result from such a gravity impact, it is extremely helpful to have a device which indicates whether or not the container has been dropped and subjected to an undesirable amount of gravity impact. The device should also preferably be capable of indicating the degree of gravity impact to which the container has been subjected. The device should also be tamper-proof and incapable of being reset.

There is a device on the market at the present time which is designed with springs and a ball in an arrangement which comes apart when the container is subjected to a fixed preset amount of gravity impact. If the amount of impact is only slightly less than the preset amount, nothing happens. If the impact is substantially greater than the preset amount, there is no way to determine how much greater the impact might have been.

There is no gravity impact indicating device available on the market at the present time which is capable of meeting the needs and requirements of manufacturers and shippers of delicate costly cargo.

SUMMARY OF THE INVENTION

The primary object of the present invention is to provide a gravity impact indicator for shipping containers which provides an accurate and tamper-proof indication of whether the container has been subjected to a gravity impact.

A more particular object is to provide such an indicator which furnishes a substantially accurate measurement of the maximum amount of impact to which the container has been subjected.

In essence, the invention contemplates a structure in which a weight is mounted for downward movement with a case against the restraint of a resilient member. When the container is subjected to gravity impact, the weight is driven downwardly and held in its lowermost position by ratchet means. The indicator accordingly shows whether the container has been subjected to gravity impact. If desired, it may also indicate with substantial accuracy the amount of such gravity impact, which may be designated by suitable indicia cooperatively arranged with respect to the ratchet means. The case is preferably sealed to prevent access to the weight or ratchet means in order to prevent release of the weight or tampering with the indicator mechanism. The indicator is preferably provided with means for preventing the weight from tipping or canting during its downward movement.

It is accordingly among the objects of the invention to provide a gravity impact indicator for shipping containers having all of the advantages and benefits of the structure set forth above and described in further detail hereinafter in this specification.

Another object of the invention is to provide such a device which is substantially fool-proof and tamper-proof in operation.

A further object is to provide a device of the type described which is substantially economical to manufacture and assemble and which is reliable in operation.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a front elevational view of a shipping container with a gravity impact indicator mounted therein;

FIG. 2 is a sectional view taken on line 2—2 of FIG. 1, showing the indicator;

FIG. 3 is a transverse sectional view taken on line 3—3 of FIG. 2;

FIG. 4 is a sectional view taken on line 4—4 of FIG. 3;

FIG. 5 is a view similar to FIG. 2 showing the position of the weight after the container has been subjected to gravity impact.

DESCRIPTION OF THE PREFERRED EMBODIMENT

A preferred embodiment which has been selected to illustrate the invention comprises a case 10 which is preferably formed of suitable tough molded plastic material such as Lexan, although other suitable materials may also be used. The case 10 preferably comprises two complementarily formed facing parts.

A blade member 11 is mounted between the two parts of the case 10 and extends along one longitudinal edge of the case 10 for the entire length of the case. The blade member 11 is provided with an inwardly directed blade 12, which extends for its entire length and which faces inwardly into a hollow chamber 13 formed within the central interior of the case 10. The blade 12 has a plurality of ratchet teeth. The blade 12 may be formed as an integral part of the blade member 11, in which case it may be formed of molded plastic material. The blade 12 may also comprise a separate member such as a piece of metal held by the blade member 11.

A spacer member 14 is mounted between two parts of the case 10 and extends along the opposite longitudinal edge of the case 10 for the entire length of the case. The blade member 11 and spacer member 14 define opposite sides of the hollow chamber within the case 10.

The parts of the case 10 are preferably cemented to the blade member 11 and spacer member 14, although they may be held together by other means such as sonic welding.

The parts of the case 10 are provided with protrusions which extend inwardly into the hollow chamber 13 slightly beyond the inner edges of the blade member 11 and spacer member 14. The inner edges of these protrusions define a pair of spaced tracks 15 which extend along opposite sides of the blade member 11 and a second pair of spaced tracks 16 which extend along opposite sides of the spacer member 14.

A weight 17, which may be formed of steel or other suitable material, is mounted for sliding movement along the track means or tracks 15 and 16 between the inwardly facing surfaces of the sides of the case 10. The weight 17 is preferably dimensioned so that either barely clears or only lightly engages each of these surfaces, so that they do not substantially interfere with vertical movement of the weight 17 within the hollow interior 13 of the case 10. At the same time, these surfaces act to prevent the weight 17 from moving in any direction other than vertical and from tipping or canting during such movement.

A post 18 extends between the opposite sides of the case 10 across the top of the hollow chamber 13. The post 18 may be integral with the case 10 or may be a separate member. A coil spring 19 is secured at its upper end to the post 18 and at its lower end to the top of the weight 17. The coil spring 19 and the weight 17 are balanced with respect to each other to provide a desired scale or range of impact indications. This may be designated by suitable markings on the case 10.

A flat spring 20 extends transversely across the top of the weight 17 and is attached thereto, preferably by the same fastening member which connects the lower end of the coil spring 10 to the weight 17. One end 21 of the flat spring 20 protrudes beyond the edge of the weight 17 into the space between the tracks 15 and is adapted to engage the teeth of the blade 12 as the weight 17 moves downwardly within the hollow chamber 13. The other end 22 of the flat spring 20 protrudes beyond the opposite edge of the weight 17 into the space between the tracks 16. The end 22 is preferably bent at a right angle and is designed to lightly engage and slide along the inwardly facing edge of the spacer member 14 between the tracks 16 as the weight 17 moves downwardly within the hollow chamber 13.

A pair of openings 23 extend through the case 10 and are adapted to receive bolts or other fastening members for mounting and holding the device in a vertical position within a cargo carrying container.

If and when the container should be subjected to gravity impact, the weight 17 will be moved downwardly within the case 10 against the tension of the coil spring 19. As the weight 17 moves downwardly, the end 21 of the flat spring 20 moves downwardly with it, travelling along the ratchet teeth of the blade 12. When downward movement of the weight 17 stops, the end 21 of the flat spring 20 engages the last ratchet tooth which it has passed and thereby holds the weight 17 in the lowermost position to which it has been driven by the impact.

It should be noted that the weight 17 is closely enclosed on all four sides, so that it cannot sway or tilt in any direction during its downward movement. This assures complete and accurate engagement of the end 21 of the flat spring 20 with the ratchet teeth of the blade 12. The other end 22 of the flat spring 20 further engages the inside of the spacer member 14 to prevent any twisting movement of the flat spring 20 and thereby hold the end 21 in correct engagement with the ratchet teeth of the blade 12.

The device should preferably be securely sealed against possible tampering. It should be formed so that the user cannot gain access to the interior for the purpose of improperly moving the weight 17 in either direction.

For demonstration purposes, such as use by a sales person, the device may be formed with the two parts of the case being separable so that the weight can be reset.

In case the container and indicator device are subjected to several gravity impacts, the device will not indicate any cumulative effects. It will indicate only the maximum amount of impact to which the container has been subjected.

I claim:

1. A gravity impact indicator for shipping containers carrying valuable delicate cargo, said indicator comprising a case, means for attaching said case to a shipping container, a weight mounted for vertical movement within the hollow interior of said case, resilient means normally restraining said weight against downward movement under normal gravity force, said resilient means comprising an elongated coil spring connected at its upper end to said case and at its lower end to said weight, said weight being adapted to move downwardly within said case upon said container being subjected to gravity impact greater than normal, means to restrain said weight against return upward movement, said means to restrain said weight comprising ratchet means engageable between said weight and said case, said ratchet means comprising a plurality of vertically spaced teeth carried by said case and means carried by said weight for engaging said teeth, means sealing said weight and weight restraining means against access from the exterior of said case to prevent changing the vertical position of said weight, and track means within said case for guiding downward movement of said weight.

2. The structure described in claim 1, said case having said track means formed into oppositely facing pairs of spaced tracks constructed and arranged to engage opposite sides of said weight.

3. The structure described in claim 2, the inner sides of said case being disposed closely adjacent to said weight to restrain movement of said weight in either direction transverse to said tracks.

4. The structure described in claim 3, said case being formed of molded plastic material and being sealed against tampering.

5. The structure described in claim 4, and indicia carried by the outside of said case to designate the amount of gravity force to which the shipping container has been subjected.

6. The structure described in claim 5, said means for engaging said teeth comprising a flat spring extending transversely to said weight, said flat spring being secured to the top of said weight, the end of said flat spring remote from said teeth engaging the inner surface of said case to retain said flat spring in proper position for engaging said teeth.

7. The structure described in claim 6, the case engaging end of said flat spring being bent at substantially a right angle, the midportion of said flat spring being secured to the top of said weight by the same fastening means which connects said coil spring to said weight.

8. The structure described in claim 3, said means for engaging said teeth comprising a flat spring extending transversely to said weight.

9. The structure described in claim 8, said flat spring being secured to the top of said weight, the end of said flat spring remote from said teeth engaging the inner surface of said case to retain said flat spring in proper position for engaging said teeth.

10. The structure described in claim 9, the case engaging end of said flat spring being bent at substantially a right angle, the midportion of said flat spring being secured to the top of said weight by the same fastening means which connects said coil spring to said weight.

* * * * *